US010089546B2

(12) United States Patent
Bellier et al.

(10) Patent No.: US 10,089,546 B2
(45) Date of Patent: Oct. 2, 2018

(54) CORRECTION AND DETECTION OF DEFECTIVE CAPACITIVE SENSOR ELEMENTS OF A FINGERPRINT SENSOR

(71) Applicant: Fingerprint Cards AB, Göteborg (SE)

(72) Inventors: Thierry Bellier, Frederiksberg (DK); France Laliberté, Frederiksberg (DK)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/443,639

(22) Filed: Feb. 27, 2017

(65) Prior Publication Data
US 2017/0344841 A1    Nov. 30, 2017

(30) Foreign Application Priority Data

May 30, 2016    (SE) ................................ 16507436

(51) Int. Cl.
    *G06K 9/00*       (2006.01)
    *G06K 9/03*       (2006.01)

(52) U.S. Cl.
    CPC ........... *G06K 9/036* (2013.01); *G06K 9/0002* (2013.01); *G06K 9/00087* (2013.01)

(58) Field of Classification Search
    CPC ............. G06K 9/00053; G06K 9/0008; G06K 9/00892; G06K 9/001
(Continued)

(56) References Cited

U.S. PATENT DOCUMENTS

| 6,980,008 B2 * | 12/2005 | Teranuma ............ G06K 9/0002 324/663 |
| 6,987,871 B2 * | 1/2006 | Kalnitsky ............... G06F 3/044 324/688 |

(Continued)

FOREIGN PATENT DOCUMENTS

| WO | 1999026187 A1 | 5/1999 |
| WO | 2008103708 A1 | 8/2008 |

OTHER PUBLICATIONS

Hiroki Morimura; Satoshi Shigematsu; Toshishige Shimamura; Katsuyuki Machida; Haraku Kyuragi, "A Pixel-Level Automatic Calibration Circuit Scheme for Capacitive Fingerprint Sensor LSIs", IEEE Journal of Solid-State Circuits, 20021001, IEEE Service Center, Piscataway, NJ, USA, ISSN 0018-9200.

(Continued)

*Primary Examiner* — Yosef Kassa
(74) *Attorney, Agent, or Firm* — RMCK Law Group PLC

(57) ABSTRACT

A method of correcting charge values acquired from a capacitive fingerprint sensor, comprising acquiring a list of one or more defective capacitive sensor elements and for defective capacitive sensor element in the list, selecting its position as a first position and:
     performing a first operation by placing a first filter window about the first position and computing a replacement value for the first position from charge values within the first filter window, but forgoing computing a replacement value for the first position in case a first threshold number of defective capacitive sensor elements located within the first filter window is exceeded;
     in case the first operation forgo computing a replacement value for the first position, performing a second operation by placing a second filter window about the first position and computing a replacement value for the first position from charge values within the second filter
(Continued)

window, but forgoing computing a replacement value for the first position in case a second threshold number of defective capacitive sensor elements located within the second filter window is exceeded; wherein the second filter window has a wider expanse than the first filter window.

14 Claims, 5 Drawing Sheets

(58) Field of Classification Search
USPC ....... 382/115, 116, 124, 149, 275; 340/5.53, 340/5.82, 5.83
See application file for complete search history.

(56) References Cited

U.S. PATENT DOCUMENTS

| | | | |
|---|---|---|---|
| 7,099,497 B2 * | 8/2006 | Chou | G06K 9/0002 382/124 |
| 7,308,153 B1 * | 12/2007 | Wang | G06K 9/40 348/607 |
| 7,545,621 B2 * | 6/2009 | Haddad | G06K 9/00053 361/220 |
| 7,584,068 B2 * | 9/2009 | Xu | G01R 31/2829 702/104 |
| 7,925,887 B2 * | 4/2011 | Burton | G06F 21/32 713/186 |
| 8,712,114 B2 * | 4/2014 | Thaniyath | G06T 5/002 382/124 |
| 8,838,991 B2 * | 9/2014 | Baker | G06F 21/32 713/186 |
| 2009/0254869 A1 | 10/2009 | Ludwig et al. | |
| 2015/0070037 A1 | 3/2015 | Pragada et al. | |

OTHER PUBLICATIONS

Swedish Search Report for Patent Application No. 1650743-6 dated Jan. 18, 2017, 2 pages.

* cited by examiner

CORRECTION AND DETECTION OF DEFECTIVE CAPACITIVE SENSOR ELEMENTS OF A FINGERPRINT SENSOR

INTRODUCTION/BACKGROUND

There is a general assumption that every individual has a unique fingerprint from which she can be uniquely identified. The skin of an individual's finger forms patterns of ridges and valleys that can be sensed by a fingerprint sensor, such as a capacitive sensor. The fingerprint sensor can generate an image of the pattern of ridges and valleys, in response to the fingerprint sensor being touched to thereby represent the fingerprint electronically in a computer-readable format.

Authentication of an individual from a fingerprint is the process of comparing at least two instances of fingerprints (skin impressions) acquired by a fingerprint sensor to determine whether these impressions are likely to come from the same individual. As fingerprint sensing and processing technology gradually produce more and more reliable verification and as more advanced processing means become available in electronic devices, fingerprint based authentication becomes more widely used—e.g. in connection with access control, authentication, for gaining access to a smart phone. In connection therewith, and in general, there is a demand for highly reliable and secure authentication of fingerprints.

However, for fingerprint sensors—at least those of the capacitive type—it is observed that the capacitive sensing elements of the fingerprint sensor may degrade over time since they may be exposed to various types of mechanical and chemical impacts.

Then it may become a problem of on the one hand maintaining a high security level in connection with authentication despite of degraded sensor elements resulting in less information available to authenticate a fingerprint and on the other hand obtaining a good lifetime of a product configured with a capacitive fingerprint sensor.

Fingerprint capacitive sensors can have pixels that are not responding as expected, either permanently or intermittently. This means that the intensity value of those pixels is not related to the capacitance of the finger at that location, but instead is always at a minimum charge value (black), at a maximum charge value (white), or any value in that range—however not related to an actual fingerprint.

Processing a fingerprint image to identify a person or verify her identity is dependent on the information available in the image. If information is missing, this process is more difficult, unreliable, or impossible. Being able to detect if information is missing from an image (i.e. defective pixels are present) is extremely important to not blindly proceed with a biometric assessment and incur a security risk (falsely verifying or identifying a person) or a failure of the system to perform its task (falsely rejecting a person). At the same time, being able to replace the missing information in order not to have to discard a sensor is extremely valuable. It is extremely costly to discard sensors at the production line level, and even more at the customer level (when a customer returns a cell phone because its fingerprint sensor is broken).

SUMMARY

It is an object to correct corrupted charge values from one or more defective sensor elements arranged in a fingerprint sensor array. In connection therewith it is an object to correct corrupted charge values in a software application.

It is an object to detect the location of one or more defective sensor elements arranged in a fingerprint sensor array. In connection therewith it is an object to detect defective sensor elements by means of a circuit at the fingerprint sensor or to detect defective sensor elements by means of a circuit at the fingerprint sensor in combination with a software application.

It is an object to detect defective sensor elements and correct corrupted values therefrom to enable users to keep devices with fingerprint sensors that would have otherwise been discarded at a production line level, and allow users to keep their devices that would have otherwise been returned due to defective sensor elements—and in turn to obtain significant cost savings.

It is also an object to increase the robustness, in the sense of being exposed to rough physical conditions, of devices such as smart phones hosting fingerprint sensors once they are in the hands of users.

There is provided a computer-implemented method, comprising:

acquiring charge values of capacitive sensor elements arranged in a fingerprint sensor array at respective positions therein;

acquiring a list of one or more defective capacitive sensor elements;

for a defective capacitive sensor element in the list, selecting its position as a first position and:

performing a first operation by placing a first filter window about the first position and computing a replacement value for the first position from charge values within the first filter window, but forgoing computing a replacement value for the first position in case a first threshold number of defective capacitive sensor elements located within the first filter window is exceeded;

in case the first operation forgo computing a replacement value for the first position, performing a second operation by placing a second filter window about the first position and computing a replacement value for the first position from charge values within the second filter window, but forgoing computing a replacement value for the first position in case a second threshold number of defective capacitive sensor elements located within the second filter window is exceeded; wherein the second filter window has a wider expanse than the first filter window.

Thereby a filtering method optimized for fingerprint images from a fingerprint sensor is provided. A replacement value for a defective capacitive sensor element in a fingerprint sensor array can thereby take the place of a corrupted value from the defective capacitive sensor element. The method is found to be robust in terms of preserving fingerprint information for subsequent processing for authentication purposes.

The acquired charge values of the capacitive sensor elements may be arranged in a fingerprint image. As a result of applying the filtering method a filtered fingerprint image may be provided.

Two important aspects of preserving fingerprint information for subsequent processing for authentication purposes have been acknowledged by the method:

Firstly, it has been discovered that by going from the first, relatively small, filter window to the second, relatively large, filter window and only when there is a sufficiently large number of defective sensor elements surrounding the defective sensor element in question, blurring or otherwise degrading the spatial cues for fingerprint authentication is, on the one hand, avoided for scattered single or limited size clusters of defective pixels. On the other hand, blurring or otherwise degrading the spatial cues for fingerprint authentication is compromised only when it yields improved authentication performance to reach out to reliable charge values by the wider filter window when needed.

Secondly, by computing the replacement value from reliable charge values, excluding corrupted values or previously replaced values, residuals from not perfectly replacing a charge value is not scattered about or carried over to other charge values.

Thus, a two-step filtering strategy that can be implemented in software to compute replacement values for defective pixels on the fingerprint sensor, in order for a fingerprint authentication process to continue robustly even in the presence of defective pixels.

In some aspects the fingerprint sensor array has a size of 50 to 250 by 50 to 250 capacitive sensor elements at about a resolution of 300 to 800 dpi, e.g. about 500 dpi. In connection therewith it has been found that the method is particularly robust in terms of preserving fingerprint information for subsequent processing for authentication purposes, when the first filter window is a 3-by-3 window and when the second filter window is a 5-by-5 filter window.

The fingerprint sensor array spans a geometrical area related to the count of capacitive sensor elements in the array and its resolution. In some aspects, the fingerprint sensor array sits in an oval or circular button and some of its capacitive sensor elements are mechanically covered and not available for sensing a fingerprint whereas others are available for sensing a fingerprint. The method may be applied to all capacitive sensor elements or be restricted to available sensor elements (i.e. to the charge values thereof). In some aspects, the charge values are cropped by signal processing. In any event thereof—and irrespective of its shape—an image edge is formed by the charge values from the outermost capacitive charge elements in the array.

In case, one or both of the first filter window and the second filter window is centred about a capacitive sensor element at the image edge or close to the image edge, the filter windows may exceed the image edge. Elements of the filter windows exceeding the image edge are not used for computing a replacement value.

The list of one or more defective capacitive sensor elements may be stored in an on-chip directory of the fingerprint sensor. The method may be implemented in software run by a processor of a device, such as a smart phone, hosting the fingerprint sensor. The method may however be run by a processor hosted (e.g. on-chip) by the fingerprint sensor.

The list of one or more defective capacitive sensor elements is obtained by a testing operation involving the fingerprint sensor and may be performed at various events as described in more details below. A defective capacitive sensor element in the list may be represented by an index number such as a one-dimensional index or a two-dimensional index. A defective capacitive sensor element may outputs a corrupted charge value, which may be a fixed value or a value varying in an unexpected manner.

The representation of the capacitive sensor element being defective may appear in the form of an index in the list so the list comprises indexes of defective pixels only. Alternatively, the list may be distributed across pixels in the form of a 'tag' or 'flag' associated with the pixels. The list may comprise status information or other type of metadata associated with each pixel or only for defective pixels.

It should be noted that the term 'pixel' may be used to denote the charge value acquired from a capacitive sensor element whether it is defective or not, sometimes the term is then 'pixel value'. The term may also be used to refer to the capacitive sensor element itself, which may also comprise analogue and digital circuitry.

The second filter window has a wider expanse than the first filter window e.g. when the second filter window covers more pixels than the first filter window and/or when the second window comprises more filter elements than the first filter window. As an example a 3-by 3 filter window comprises 9 filter elements.

In some embodiments a replacement value for the first operation or the second operation is computed from charge values within an expanse of the first filter window or the second filter window, respectively, while forgoing averaging across replacement values.

Thus, only the values of reliable charge values are used in the computation; the computed replacement values at the first filtering step, are not used during the second filtering step.

It is thereby ensured that the result of the filtering method does not depend on the order in which the filtering method is applied to the fingerprint image. Additionally, the confidence of the replacement values is maximized while error propagation is reduced. Only the originally acquired charge values of working capacitive sensor elements are used in the computation of the replacement values for defective sensor elements.

In some embodiments a replacement value for one or both of the first operation and the second operation is/are computed as an average value or a median value or a weighted average value.

In some aspects thereof, averaging is performed by weighing reliable charge values within one or both of the first filter window and the second filter window equally or uniformly.

Thus, in one aspect, firstly, a 3-by-3 equally weighted averaging filter is applied at the location of each defective pixel. In case an already replaced defective pixel is inside the first filtering window of a defective pixel currently being processed, its replacement value will not be used in the current computation. This is to:

ensure that the result of the filtering does not depend of the order in which the filter is applied to the image; and maximize the confidence of the replacement values and reduce the error propagation. Only the original values of the valid pixels, i.e. pixels that are not defective, are used in the computation of the replacement values of defective pixels.

After this filtering with a filter of size 3-by-3, if there are still defective pixels for which we could not compute a replacement value because there were no valid pixels in an area of size 3-by-3, a 5-by-5 equally weighted averaging filter is applied.

In some embodiments the charge values of the capacitive biometric sensor elements are arranged in a data structure, and wherein charge values are addressable by their position in the fingerprint sensor array; comprising: in case the first operation or the second operation computes a valid replacement value for each position in the list of one or more defective capacitive sensor elements: and entering or replacing a charge value at the first position by a replacement value for the first position computed by the first operation or the second operation.

Thereby charge values acquired from the fingerprint sensor are stored in the data structure and the filtering method replaces corrupted charge values by replacement values in that data structure without making a copy of the data structure. Thus, at a first point in time, when the charge values have been acquired from the fingerprint sensor, the data structure holds an input fingerprint image (input to the filtering method) and at a second point in time, when the filtering method has been performed the data structure holds an output fingerprint image (for input to further processing). The data structure may be a fingerprint image data structure.

Processing, such as processing related to authentication, of the filtered fingerprint image can then be performed without explicitly handling corrupted values from defective pixels.

In some aspects the method comprises retrieving charge values from the sensor and storing retrieved charge values in an input data structure, performing the filter operations as set out above and entering the charge values and replacement values in an output data structure which is made accessible for further processing such as authentication processing.

In other aspects the filter operations are performed on the data structure which is retrieved from sensor replacing a charge value at the first position by a replacement value.

In some embodiments the method comprises: in case the second operation forgo computing a replacement value for the first position: initiate reporting to a software application, configured to handle user interaction via a user interface, that the capacitive biometric sensor is broken.

Thereby, a user may be notified that the fingerprint sensor should be replaced. The filtering method, which typically will be performed to replace corrupted charge values from defective pixels without a user being notified, may thereby initiate reporting to a software application, configured to handle user interaction via a graphical display, that the capacitive biometric sensor is broken. Such reporting may take place via an operating system of the device, such as a smart phone, hosting the fingerprint sensor.

In some embodiments the method comprises performing a first test operation to detect defective capacitive sensor elements at the fingerprint sensor by:

switching at least a first group of capacitive sensor elements at the capacitive fingerprint sensor to a first reference charge level using circuitry on the capacitive fingerprint sensor and while the first group of capacitive sensor elements are switched to the first reference charge level, acquiring first test charge values from the capacitive sensor elements in the first group;

for capacitive sensor elements in the first group and their respective first test charge value:

computing a deviation between the respective first test charge value and a predefined first reference value;

evaluating the deviation against a first criterion and in case the first criterion is not fulfilled: adding a representation of the capacitive sensor element being defective to the list.

Thereby it is possible to verify whether selected or each pixel in the fingerprint sensor outputs a charge value corresponding to the first test charge value. The selected pixels may be chosen to form a checkerboard pattern.

The predefined first reference value may correspond to an extreme value of a measureable range of charge values or an intermediate value. The deviation may be computed as the difference between the respective first test charge value and a predefined first reference value. The deviation may be evaluated against a threshold value or a quantile of a distribution of the first test charge values.

In some aspects, the circuitry on the capacitive fingerprint sensor switches an input of a charge-to-voltage converter from a sensing element to a capacitor with a predefined charge.

In some embodiments the method comprises performing a second test operation to detect defective capacitive sensor elements at the fingerprint sensor by:

switching at least a second group of capacitive sensor elements at the capacitive fingerprint sensor to a second reference charge level, different from the first reference charge level, using circuitry on the capacitive fingerprint sensor and while the first group of capacitive sensor elements are switched to the second reference charge level, acquiring second test charge values from the capacitive sensor elements in the first group;

for capacitive sensor elements in the second group and their respective second test charge value:

computing a deviation between the respective second test charge value and a predefined second reference value;

evaluating the deviation against a criterion; and in case the second criterion is not fulfilled: adding a representation of the capacitive sensor element being defective to the list.

The second test operation differs from the first test operation in that a second reference charge level is used and in that a second group of capacitive sensor elements is used.

Thus, by using the first test operation and the second test operation concurrently for mutually exclusive first and second groups of pixels it is possible to test whether pixels respond independently—or are erroneously coupled in one way or another. The first group may form the 'white' patches of the checkerboard pattern and the second group may form the 'black' patches of the checkerboard pattern.

Subsequently, the first and second reference charge levels may be altered (i.e. to apply an inverted checkerboard pattern) to test if the pixels also respond to a different charge level as expected.

For the captured 'checkerboard image', the median value of the black pixels and the median value of the white pixels is computed. If a pixel deviates by more than a threshold from the median value of the group of pixels to which the pixel belongs, it may be added to the list of defective pixels or otherwise labelled as being defective.

In some embodiments the method comprises: performing one or both of the first test operation and the second test operation using a third group of capacitive sensor elements at the capacitive fingerprint sensor; wherein the third group of capacitive sensor elements comprises substantially all capacitive sensor elements in the array.

Thereby it is possible to verify whether the fingerprint sensor outputs a uniform fingerprint image. If a pixel deviates by more than a threshold from the median value of the group of substantially all pixels, it may be added to the list of defective pixels or otherwise labelled as being defective.

In some embodiments the below test operations are performed:

the first test operation is performed for a first group of capacitive sensor elements encompassing substantially all of the capacitive sensor elements, of the fingerprint sensor, exposed to detect a fingerprint;

the first test operation is performed for a second group of capacitive sensor elements;

the second test operation is performed for the second group of capacitive sensor elements;

the first test operation is performed for a third group of capacitive sensor elements;

the second test operation is performed for the third group of capacitive sensor elements;

wherein the first group of capacitive sensor elements and the second group of capacitive sensor elements are mutually exclusive.

In summary, by applying the test operations as set out above it is possible to detect a defective pixel effectively since it is exposed to various test conditions.

In some embodiments one or more of the test operations is/are performed in response to a detection of one or more of:
powering on of an electronic device configured with the capacitive fingerprint sensor,
waking from a power-saving mode such as sleep mode or hibernation mode,
a capacitive object such as a being's finger in proximity of or in contact with the capacitive biometric sensor, and
an enrolment process being initiated.

The relatively frequent detection of defective pixels takes care of the occurrence of intermittent defective pixels, which are pixels that sometimes respond as expected and sometimes do not. The causes for a pixel being temporarily defective are not fully revealed. Also, the relatively frequent detection of defective pixels takes care of pixels that became defective due to physical damage to the sensor by the user. If the detection was only performed in connection with e.g. production of the sensor or the device hosting the sensor, intermittent defective pixels and defective pixels caused by physical damage to the device by the user could slip through to authentication processes and affect biometric performances.

By applying the test operations as set out above and in response to the events set out above it is possible to also detect a temporarily defective pixel and a defective pixel caused by physical damage to the phone by the user since it is exposed to various test conditions during or in connection with normal use of a device hosting the sensor. Thus by applying the test operations as set out above, the filtering method adapts its filtering to what is needed for a current state of the fingerprint sensor.

In some embodiments the method comprises: in case the list of one or more defective capacitive sensor elements exceeds a threshold length: reporting to a software application, configured to handle user interaction via a graphical display, that the capacitive biometric sensor is broken.

In some embodiments one or more of the test operations is/are performed in response to a detection of one or more of:
test of the wafer while the capacitive sensor elements still forms a portion of the wafer;
test of the integrated circuit dies after being cut out from a wafer,
test of the integrated circuit dies while installed in a land grid array; and
test of the integrated circuit dies while installed in a sensor module.

Thus the detection of defective pixels may be performed during hardware production or as an end-of-line quality inspection. Especially, in connection with hardware test during production, the sensor is discarded in presence of more than a threshold number of defective pixels.

Defective pixels may additionally be detected as set out above, when the device has been delivered to a user and is in use by the user.

Each of the test operations may provide a list of locations of defective pixels. These lists are combined, while eliminating duplicates to provide a single list of locations of defective pixels to the filtering method.

There is also provided a computer-readable medium carrying a program configured to perform the method as set out above when the method is a computer-implemented method run on a computer.

There is also provided an apparatus loaded with a computer program configured for enrolment and authentication of fingerprint images comprising a fingerprint sensor and a computing device configured to perform the method as set out above.

There is also provided an apparatus wherein the apparatus is one of a mobile phone, a smart phone, a tablet computer, a credit card, a payment system, a laptop computer and a general purpose computer.

Here and in the following, the terms 'apparatus', 'module' etc. are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

BRIEF DESCRIPTION OF THE FIGURES

A more detailed description follows below with reference to the drawing, in which.

DETAILED DESCRIPTION

Figure 1:
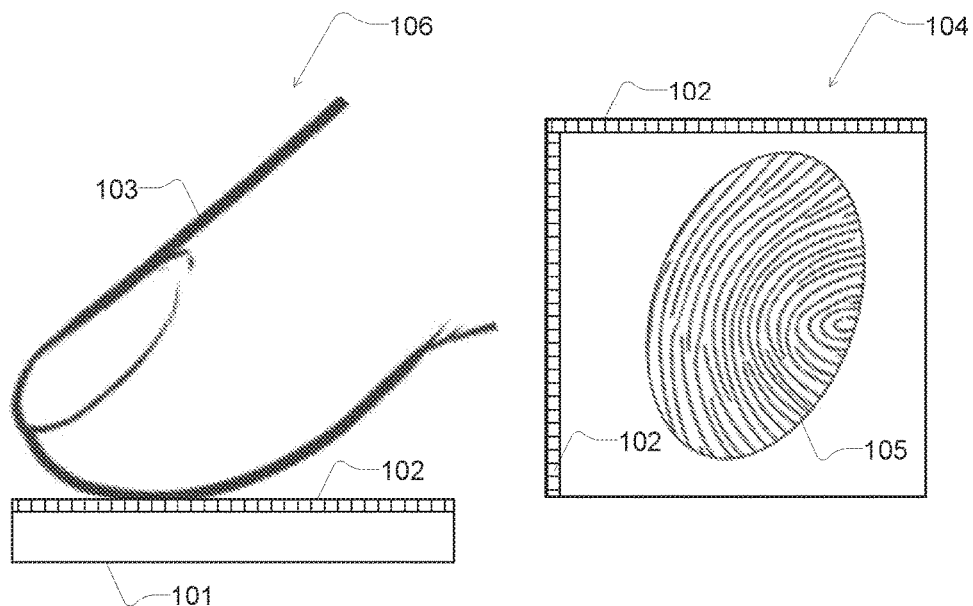
FIG. 1 shows a side view and a top view of a capacitive fingerprint sensor.

FIG. 1 shows a side view and a top view of a capacitive fingerprint sensor. The side view 106 of the capacitive fingerprint sensor 101 is shown on the left-hand side, where it can be seen that a finger 103 is touching sensor elements 102 at the capacitive fingerprint sensor 101. The top view 104 is shown on the right-hand side where only one row and one column of sensor elements in an array of sensor elements are shown. For illustration, a fingerprint image 105 is shown on top of the fingerprint sensor.

Figure 2:
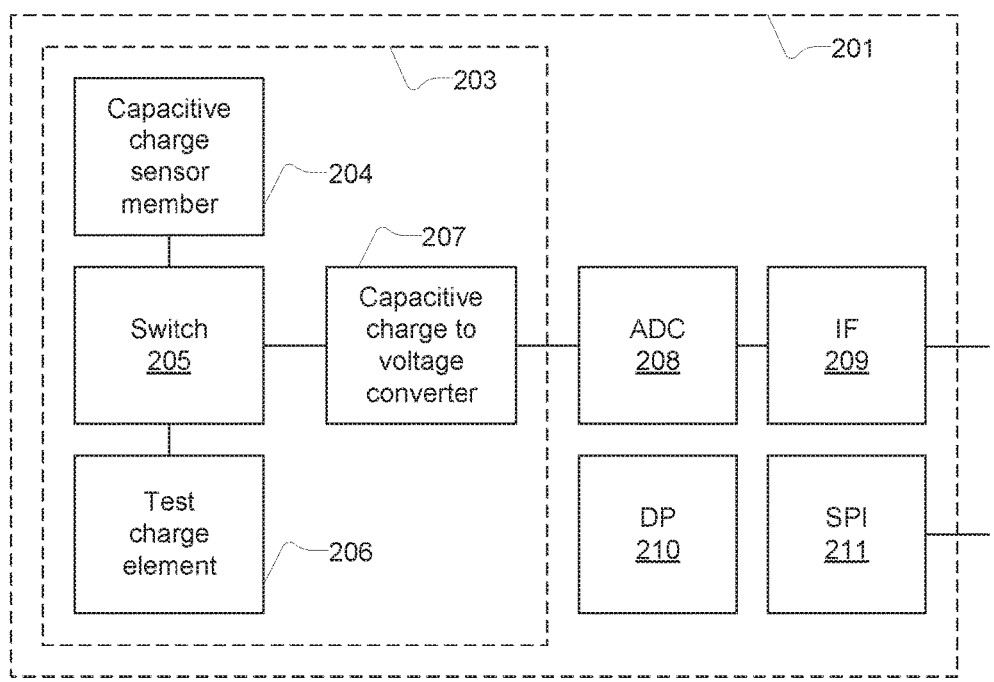
FIG. 2 shows circuitry of a capacitive fingerprint sensor.

FIG. 2 shows circuitry of a capacitive fingerprint sensor. The capacitive fingerprint sensor 201 comprises a capacitive sensor member 203 arranged in a fingerprint sensor array with multiple capacitive sensor members as it is known in the art. Thus, when a finger is pressed against, touches or is in close proximity to the surface of the array of capacitive sensor members, the capacitances of the capacitors formed between the finger and the capacitive sensor members are locally changed in accordance with the ridges and valleys. The information about the capacitance distribution is transformed into an electric signal.

A capacitive sensor element 203 is also denoted a pixel 203. The pixel 203 comprises a capacitive charge sensor member 204, which may be in the form of an electrically conducting plate. The capacitive charge sensor member 204 is coupled to a capacitive charge to voltage converter 207 via a switch 205 when the switch is in a first position. When the switch is in a second position the capacitive charge to voltage converter 207 is coupled to a test charge element 206, which stores a reference charge level. The switch 205 may have additional positions and the pixel 203 may have additional test charge elements such that additional reference charge levels can be selectively coupled to the capacitive charge to voltage converter 207 via the switch 205.

Via an analogue-to-digital converter (ADC) 208 and an interface (IF) 209 it is possible to acquire charge values from the pixels in the array either from the capacitive charge sensor member 204 or from the test charge element 206.

One or more of the switch 205, the circuitry of capacitive charge to voltage converter 207, the ADC 208, the interface 209 may be controlled via a serial programmable interface (SPI) 211.

A list of defective pixels may be stored in a memory circuit (DP) 210, wherefrom a list of one or more defective capacitive sensor elements may be acquired via the serial programmable interface 211.

Other aspects of a capacitive fingerprint sensor, such as multiplexing circuitry, are not shown. The capacitive fingerprint sensor may be implemented as a so-called Application Specific Integrated Circuit, ASIC.

In some aspects, settings of the fingerprint sensor are adjusted by changing the signal path in the mixed-mode analogue/digital circuitry section.

In some embodiments, the setting of the fingerprint sensor is adjusted by changing a level shift setting in the fingerprint sensor. The level shift may be one or more of a digital offset or a DC voltage shift or a DC current shift. The DC voltage shift or the DC current shift may be set in an analogue or mixed-mode domain of the fingerprint sensor. The shift may also or alternatively be set in an analogue-to-digital converter of the fingerprint sensor.

The methods disclosed below may be performed by a processor (not shown) in communication with the fingerprint sensor.

Figure 3:
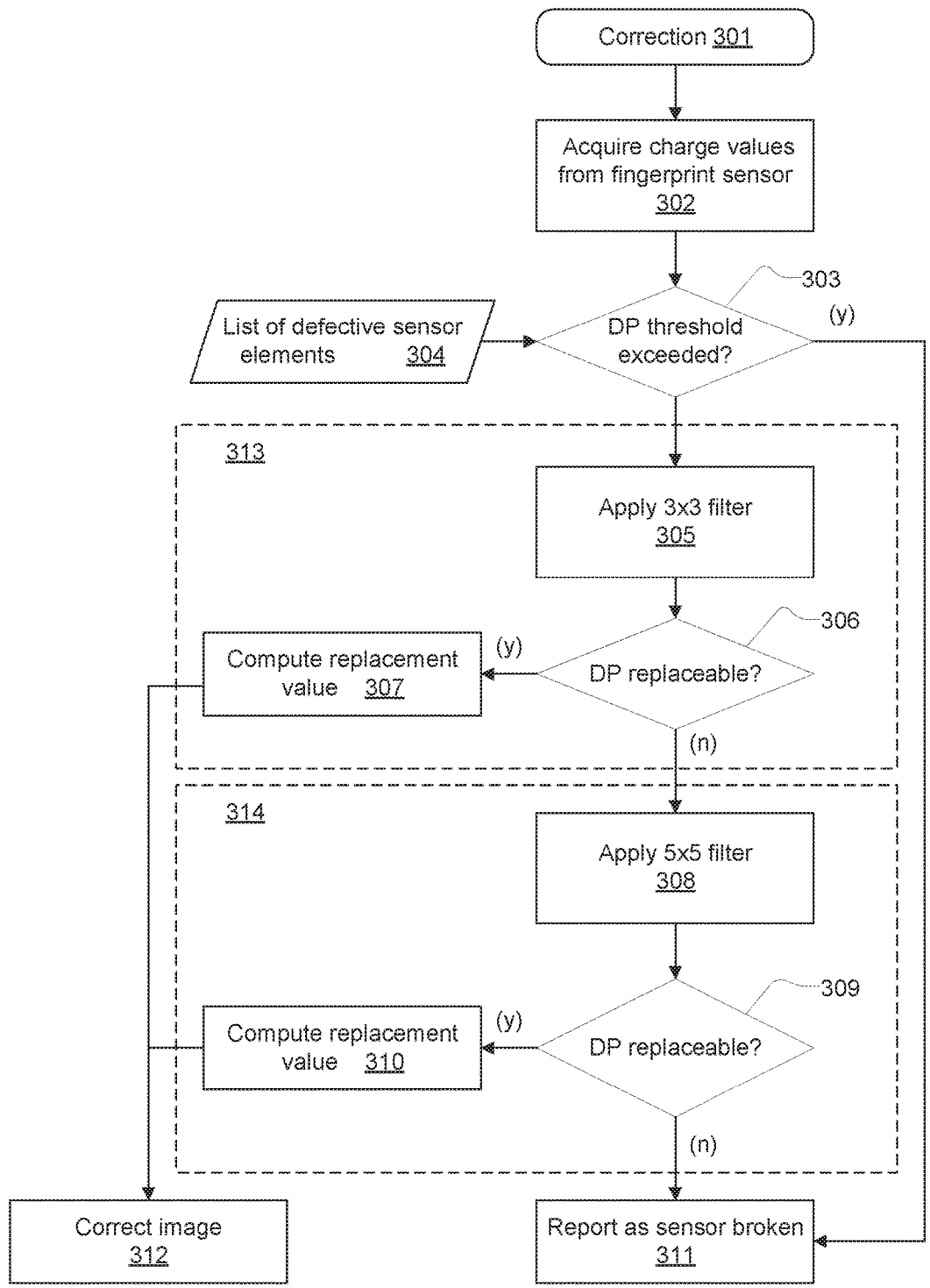
FIG. 3 shows a flowchart of correcting corrupted values from defective capacitive sensor elements.

FIG. 3 shows a flowchart for a method of correcting corrupted values from defective capacitive sensor elements. The method starts in step 301 in response to one or more defective pixels being detected and made identifiable in a list of defective sensor elements. In step 302 charge values are acquired from the fingerprint sensor to thereby acquire a fingerprint image. In step 303 the list 304 of defective capacitive sensor elements is loaded and it is determined whether the count of defective capacitive sensor elements exceeds a threshold. In the affirmative event thereof (y), the sensor is reported as being broken in step 311. Alternatively, the method proceeds to process (corrupted) values from defective sensor elements in the list 304 by a first filter operation 313 and in some events by a second filter operation 314. The method progressively process the corrupted values: in the following denoting each position: 'a first position'.

The first filter operation 313 is performed in step 305, step 306 and step 307 by applying, i.e. placing, a first filter window about the first position and computing a replacement value in step 307 for the first position from charge values within the first filter window, but forgoing computing a replacement value for the first position in case a first threshold number of defective capacitive sensor elements located within the first filter window is exceeded. As indicated the first filter window is e.g. 3-by-3 filter elements.

In case the first operation 313 forgo computing a replacement value for the first position (i.e. the route designated 'n' out of step 306), the method performs a second operation 314. The second operation 314 is performed by step 308, step 309 and step 310 by applying, i.e. placing, a second filter window about the first position and computing a replacement value in step 310 for the first position from charge values within the second filter window, but forgoing computing a replacement value for the first position in case a second threshold number of defective capacitive sensor elements located within the second filter window is exceeded. If in step 309 it is determined that the charge value is not replaceable, the sensor is reported as being broken in step 311. As indicated the second filter window is e.g. 5-by-5 filter elements.

It should be noted that the filter windows may be selected to have another size e.g. 5-by-5 and 7-by-7. In some aspects, the method comprises an additional third filter operation that follows the second filter operation 314 and is performed in the same way as the first filter operation 313 and the second filter operation 314. In connection therewith a third filter window is chosen and a corresponding third threshold number is set.

When a replacement value is computed either in step 307 or in step 310, the corrupted charge values are replaced and an image containing the charge values is corrected (updated) accordingly.

Figure 4:
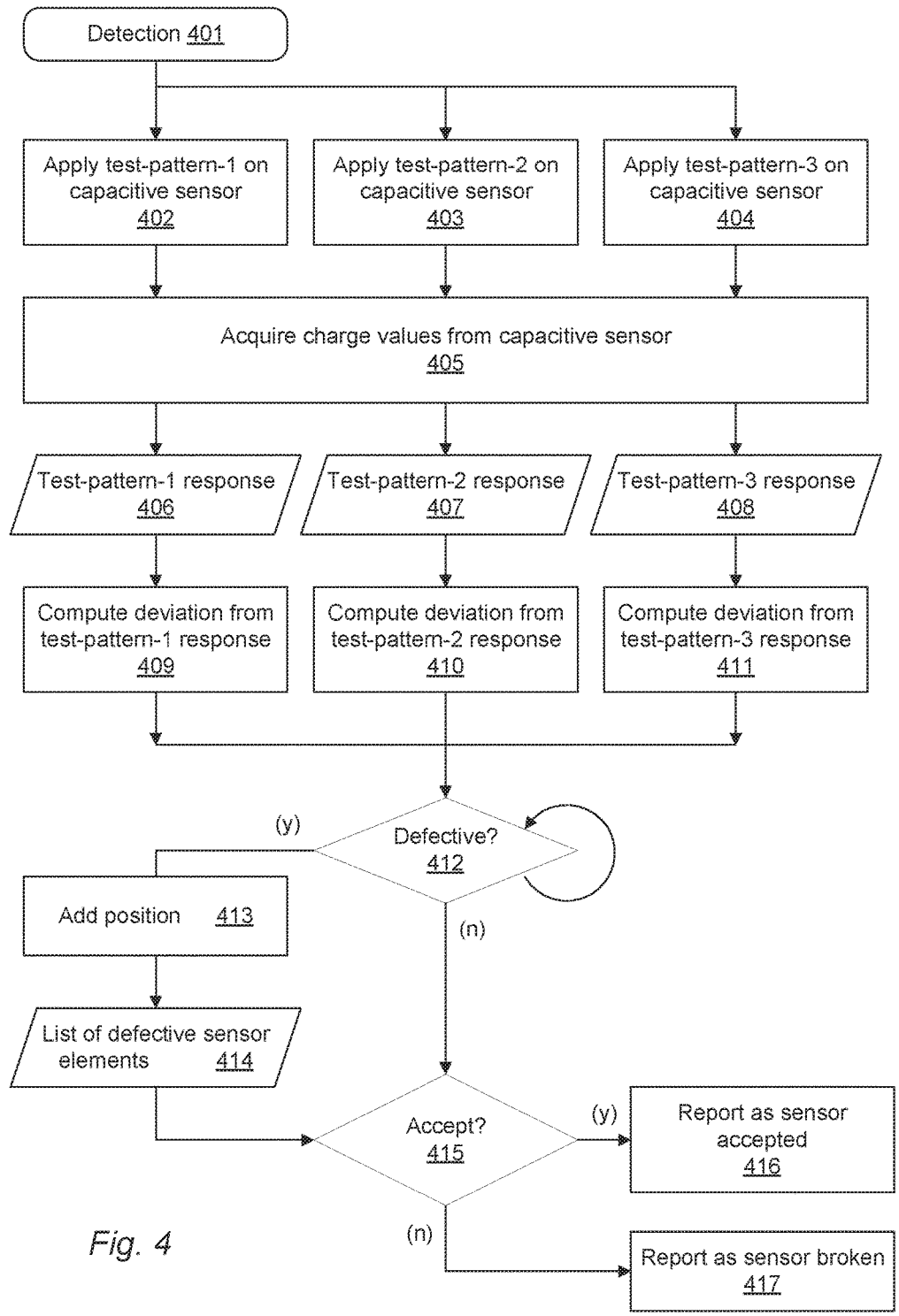
FIG. 4 shows a flowchart of detecting defective capacitive sensor elements.

FIG. 4 shows a flowchart for a method of detecting defective capacitive sensor elements. The method starts in step 401 in connection with events during production of the fingerprint sensor or a device hosting the fingerprint sensor or in connection with use case events when the device is delivered to the user. These events are mentioned above.

As described e.g. in connection with FIG. 2 it is possible to perform different test operations at the fingerprint sensor. These different test operations use respective test patterns, where a test pattern e.g. is illustrated by a checkerboard pattern, an inverted checkerboard pattern and a uniform pattern. These test patterns are respectively denoted test-pattern-1, test-pattern-2 and test-pattern-3. The test patterns are applied in turn in step 402, step 403 and step 404. It should be noted that other test patterns may be useful—e.g. patterns with bands or lines in a horizontal, vertical, or diagonal direction etc.

For each test pattern, charge values from the capacitive sensor are acquired in step 405 at appropriate points in time e.g. in the form of an image. As a result of acquiring the charge values, respective test pattern responses 406, 407, and 408 are made available e.g. each at a time, one overwriting the previous.

In respective steps 409, 410 and 411 deviations between the charge values of each pixel and a predefined reference value are computed for each pixel. For each test pattern response and for each pixel the deviation is evaluated against a respective criterion; and in case the respective criterion is not fulfilled (i.e. the pixel is defective) its position in the array is added to the list 414 of defective pixels in step 413.

When the respective test pattern responses have been evaluated as described above, step 415 determines whether the response from fingerprint sensor can be accepted. This may be done by evaluating the length of the list of defective pixels and/or other criteria. As a result thereof it is reported that the sensor is accepted in step 416 or in step 417 it is reported that the sensor is broken.

Figure 5:
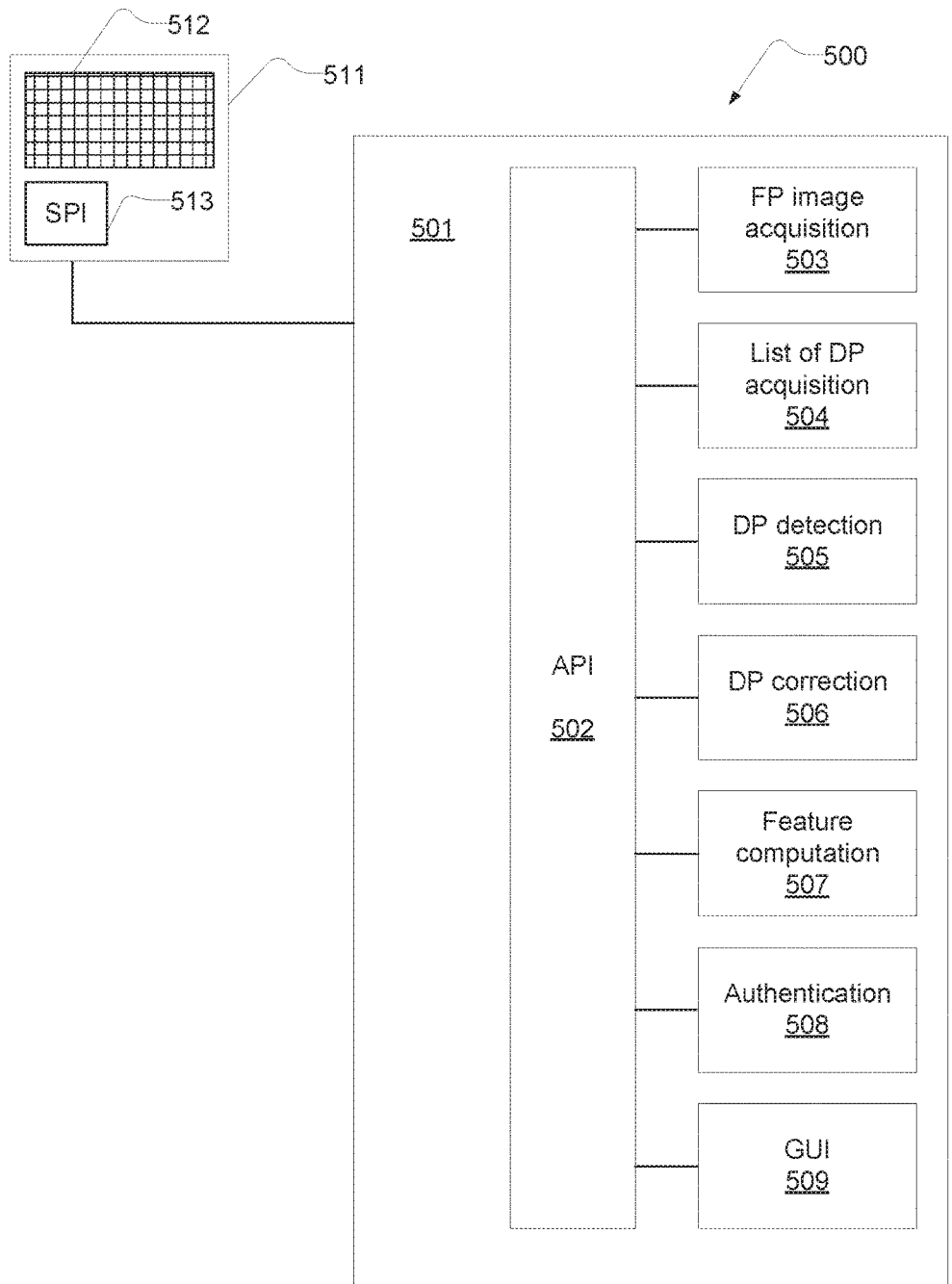
FIG. 5 shows a block diagram of a device hosting a fingerprint sensor.

FIG. 5 shows a block diagram of a device hosting a fingerprint sensor and comprising software components for performing the detection and correction described above. The device 500 comprises a processing unit 501, which may be a microprocessor dedicated to the processing of fingerprint images or a central processing unit of for instance a smart phone, which may dynamically scale its resource allocation to the method as required.

The processing unit 501 is in communication with a fingerprint sensor 511, which comprises a matrix array 512 of capacitive charge sensor members. The fingerprint sensor 511 may comprise a serial programmable interface 513 through which the processing unit 501 communicates with the fingerprint sensor 511 for acquiring fingerprint images sensed by it and for configuring the fingerprint sensor by communicating settings to it. The processing unit 501 runs software components that are accessible via an Application Programming Interface 502.

The software components comprise:

A fingerprint image acquisition component 503, which acquires charge values from the capacitive sensor elements, pixels, arranged in the array of the fingerprint sensor and stores a fingerprint image.

A component 504, which acquires and stores a list of defective pixels.

A defective pixels detection component 505, which implements the detection method described above.

A defective pixels correction component 506, which implements the filtering method described above.

A feature computation component 507, which computes image features from the fingerprint images.

An authentication component 508, which performs authentication processes to verify an authenticated user or reject a non-authenticated user; and A user interface 509, designated GUI.

It should be noted that other ways of structuring the software components are possible and that other software components interface via the API. Such other components may comprise components for activating fingerprint acquisition and processing during a sleep mode; a component for adapting signal levels at the hardware level of the fingerprint sensor such as a component for communicating settings to/from the fingerprint sensor. The software components also comprise a fingerprint application for controlling one or more of the above.

Figure 6:
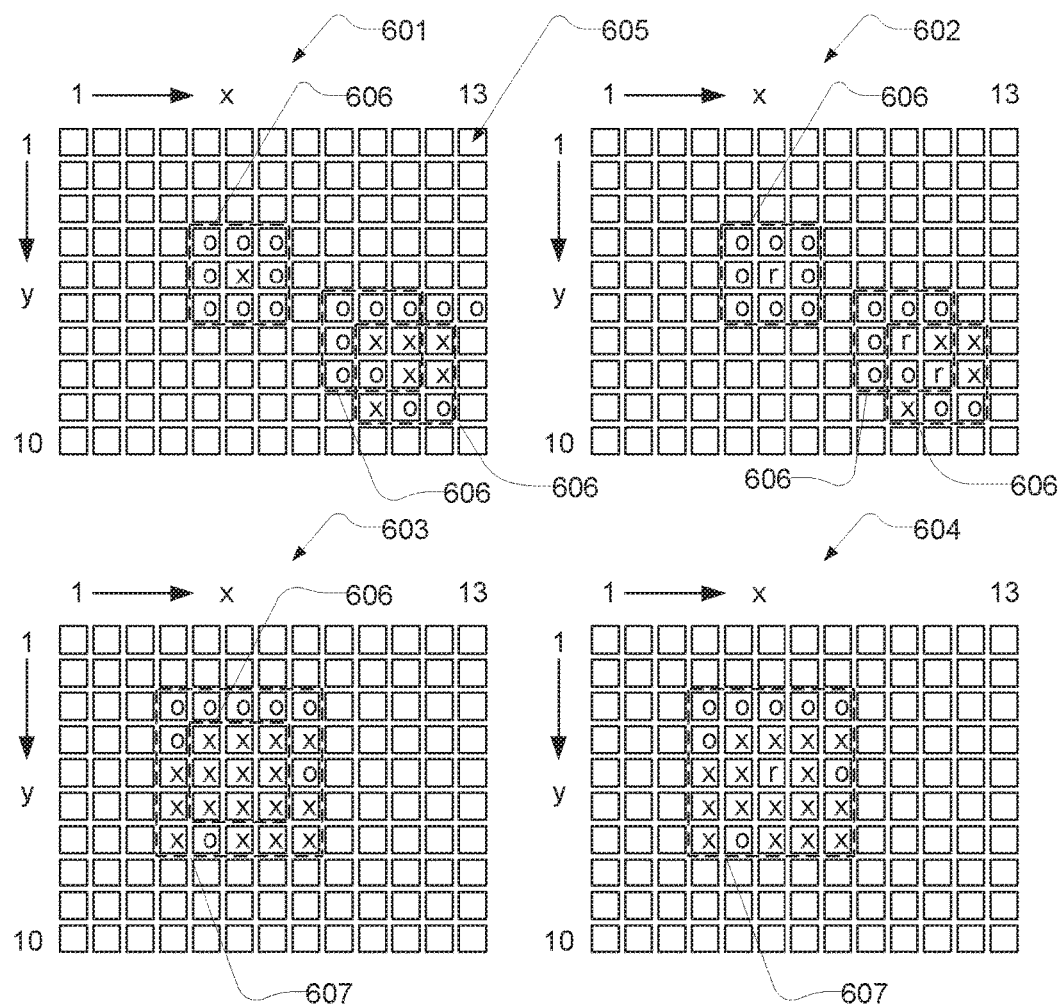
FIG. 6 shows examples of filter windows.

FIG. 6 shows examples of filter windows located in segments of pixels. In this example the segments 601, 602, 603 and 604 of pixels generally designated 605 have a size of 13-by-10 pixels arranged in a matrix array and represent a segment of a fingerprint image. Positions in the array are designated by two-dimensional positions (x,y).

Pixels marked with the letter 'o' represent valid pixels (i.e. not defective pixels) and are expected to output reliable charge values. Pixels marked with the letter 'x' represent defective pixels and pixels marked with the letter 'r' represents defective pixels for which a replacement value is computed. Thus, as an example, the list of defective pixels for segment 601 may be {(6,5), (10,7), (11,7), (12,7), (11,8), (12,8), (10,9)}.

As an example, the first filter window is shown as a 3-by-3 window and the second filter window is shown as a 5-by-5 window.

In segment 601 the first filter window 606 (shown by a dashed-line box) is positioned about a defective pixel at position (6,5) and captures the charge value of 8 valid pixels from which a replacement value can be computed. The result of applying the first filter window 606 is shown in segment 602.

Also in segment 601, the first filter window 606 is moved to be positioned about a defective pixel at position (10,7) and a defective pixel at position (11,8). The results of applying the first filter window 606 at these two positions are also shown in segment 602. For the first filter window applied at position (11,8) the pixels designated 'r'—and 'x'—will not be included in computing a replacement value. In this way the order of positions in which the first filter window is applied to the defective pixels or charge values therefrom does not play a role for the replacement values being computed.

In segment 603 an example is shown where the operation applying the first filter window 606, when positioned about the defective pixel at position (6,5) would forgo computing a replacement value because there are only defective pixels (marked with 'x') within the window. Therefore the second window 607, which is larger (5-by-5) is applied. The second window 607 encloses 8 valid pixels. In case the criterion is that the second window must enclose more than 5 pixels, the criterion would be satisfied and a replacement value computed as shown in segment 604.

Effects of the first window 606 or the second window 607 being located at the rim of the array such that the window encloses 'non-existing' pixels outside the array are not shown. However, such 'non-existing' pixels may count as defective pixels and not be included for computing a replacement value.

In general, the method may be a computer-implemented method. The method or the computer-implemented method may be performed by one or both of a programmed computer and hardware such as a fingerprint sensor.

Acquisition of a fingerprint image may also be denoted capture of a fingerprint image.

The invention claimed is:

1. A computer-implemented method, comprising:
acquiring charge values of capacitive sensor elements arranged in a fingerprint sensor array of a capacitive fingerprint sensor at respective positions therein;
acquiring a list of one or more defective capacitive sensor elements;
for a defective capacitive sensor element in the list, selecting its position as a first position:
placing a first filter window about the first position;
when a number of defective capacitive sensor elements located within the first filter window is lower than a first threshold number, computing a replacement value for the first position from charge values within the first filter window;
when the number of defective capacitive sensor elements located within the first filter window exceeds said first threshold number, placing a second filter window about the first position; and
when a number of defective capacitive sensor elements located within the second filter window is lower than a second threshold number, computing said replacement value for the first position from charge values within the second filter window,
wherein the second filter window has a wider expanse than the first filter window.

2. The method according to claim 1, wherein said replacement value is computed as an average value or a median value or a weighted average value.

3. The method according to claim 1, wherein the charge values of the capacitive biometric sensor elements are arranged in a data structure, and wherein charge values are addressable by their position in the fingerprint sensor array, said method comprising:
entering or replacing a charge value at the first position by said replacement value for the first position.

4. The method according to claim 1, comprising:
when the number of defective capacitive sensor elements located within the second filter window exceeds said second threshold number, initiating reporting to a software application, configured to handle user interaction via a user interface, that the capacitive fingerprint sensor is broken.

5. The method according to claim 1, comprising performing a first test operation to detect defective capacitive sensor elements of said fingerprint sensor array by:

switching at least a first group of said capacitive sensor elements to a first reference charge level using circuitry comprised in the capacitive fingerprint sensor and while the first group of capacitive sensor elements are switched to the first reference charge level, acquiring first test charge values from the capacitive sensor elements in the first group;

for capacitive sensor elements in the first group and their respective first test charge value:

computing a deviation between the respective first test charge value and a predefined first reference value; and evaluating the deviation against a first criterion and when the first criterion is not fulfilled: adding a representation of the capacitive sensor element being defective to the list.

6. The method according to claim 5, comprising performing a second test operation to detect defective capacitive sensor elements of said fingerprint sensor array by:

switching at least a second group of said capacitive sensor elements to a second reference charge level, different from the first reference charge level, using circuitry comprised in the capacitive fingerprint sensor and while the second group of capacitive sensor elements are switched to the second reference charge level, acquiring second test charge values from the capacitive sensor elements in the second group;

for capacitive sensor elements in the second group and their respective second test charge value:

computing a deviation between the respective second test charge value and a predefined second reference value;

evaluating the deviation against a criterion; and when the second criterion is not fulfilled: adding a representation of the capacitive sensor element being defective to the list.

7. The method according to claim 6, comprising:

performing one or both of the first test operation and the second test operation using a third group of capacitive sensor elements at the capacitive fingerprint sensor;

wherein the third group of capacitive sensor elements comprises substantially all capacitive sensor elements in the array.

8. A method according to claim 6, wherein the below test operations are performed:

the first test operation is performed for a first group of capacitive sensor elements encompassing substantially all of the capacitive sensor elements, of the fingerprint sensor, exposed to detect a fingerprint;

the first test operation is performed for a second group of capacitive sensor elements;

the second test operation is performed for the second group of capacitive sensor elements;

the first test operation is performed for a third group of capacitive sensor elements;

the second test operation is performed for the third group of capacitive sensor elements;

wherein the first group of capacitive sensor elements and the second group of capacitive sensor elements are mutually exclusive.

9. The method according to claim 8, wherein one or more of the test operations is/are performed in response to a detection of one or more of:

powering on of an electronic device configured with the capacitive fingerprint sensor, waking from a power-saving mode such as sleep mode or hibernation mode, a capacitive object such as a being's finger in proximity of or in contact with the capacitive biometric sensor, and an enrolment process being initiated.

10. The method according to claim 9, comprising:

when the list of one or more defective capacitive sensor elements exceeds a threshold length:

reporting to a software application, configured to handle user interaction via a graphical display, that the capacitive fingerprint sensor is broken.

11. The method according to claim 8, wherein one or more of the test operations is/are performed in response to a detection of one or more of:

test of the wafer while the capacitive sensor elements still forms a portion of the wafer;

test of the integrated circuit dies after being cut out from a wafer, test of the integrated circuit dies while installed in a land grid array; and test of the integrated circuit dies while installed in a sensor module.

12. A non-transitory computer-readable medium carrying a program configured to perform the method as claimed in claim 1 when the method is a computer-implemented method run on a computer.

13. An apparatus loaded with a computer program configured for enrolment and authentication of fingerprint images comprising a fingerprint sensor and a computing device configured to perform the method as claimed in claim 1.

14. The apparatus according to claim 13, wherein the apparatus is one of a mobile phone, a smart phone, a tablet computer, a credit card, a payment system, a laptop computer and a general purpose computer.

* * * * *